July 10, 1962 A. KRASZESKI 3,042,968
APPARATUS FOR PRODUCING OPENWORK PLASTIC
SHEET MATERIAL AND THE LIKE
Filed May 20, 1960

INVENTOR
ARTHUR KRASZESKI

BY *P. J. Poindexter*

AGENT

United States Patent Office 3,042,968
Patented July 10, 1962

3,042,968
AN APPARATUS FOR PRODUCING OPENWORK
PLASTIC SHEET MATERIAL AND THE LIKE
Arthur Kraszeski, Paris, France
(Rte. 9-W, MD-26, Newburgh, N.Y.)
Filed May 20, 1960, Ser. No. 30,687
Claims priority, application France June 10, 1959
1 Claim. (Cl. 18—15)

This invention relates to an apparatus for manufacturing openwork plastic sheet material.

The objects of this invention include inter alia the provision of an apparatus for producing openwork plastic sheet material imitating lace, curtains and openwork decorative articles, such as doilies, etc. A further object is the provision of an apparatus to prepare the openwork plastic sheet material in a continuous manner.

The foregoing objects are accomplished by the provision of an apparatus for carrying out a continuous method for producing openwork plastic sheet material which comprises depositing a fluid plastic film forming composition of the surface of a rotating endless engraved belt, the engraved areas of which are interconnected, removing the excess compositions from the unengraved surface of the belt, heating the composition while in the interconnected engraved area of the belt to set the composition, cooling the composition below its deformation temperature while in the engraved portion of the belt and removing cooled plastic openwork from the engraving. The plastic film forming compositions useful in carrying out this invention include those which are fluid at room temperature and can be caused to set in the engraved mold when heated to a temperature about 160° C. for a period of about one to two minutes.

The apparatus of this invention is described hereinafter by reference to preferred embodiments shown in the accompanying drawing wherein.

The openwork plastic sheet materials are preferably formed from plasticized polyvinyl chloride paste compositions which are well known to the plastic industry. The ungelatinized polyvinyl chloride particles, pigments and other solid particle components are dispersed in a liquid plasticizer for the resin which is a non-solvent for the resin at room temperature and a solvent at elevated temperature (i.e. about 160° C.) to form a flowable paste at room temperature.

Figure 1:
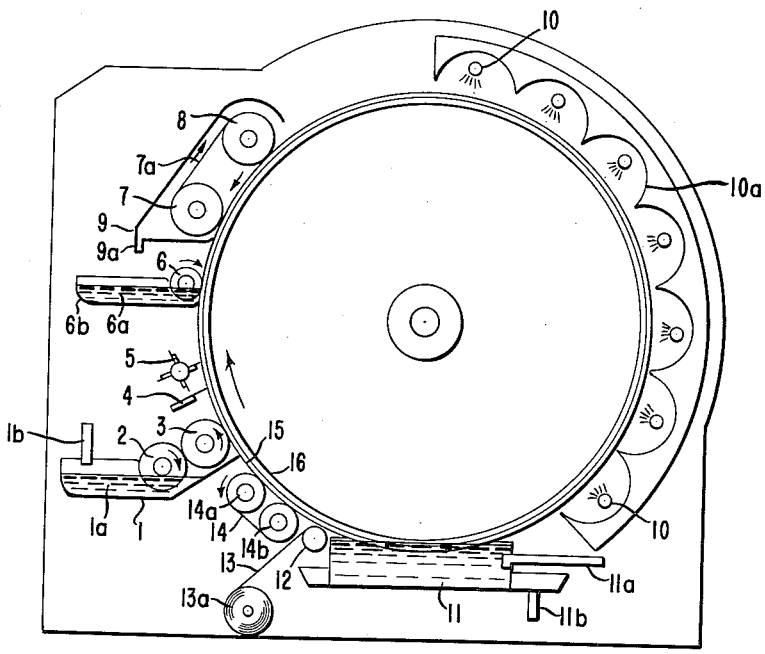
FIGURE 1 is a side view of the apparatus for carrying out the process showing an engraved belt (mold) mounted on a single cylinder together with the auxiliary rolls, reservoir, heating elements, cooling station, wind-up and other essential components.

Referring to FIGURE 1 of the drawing, my invention is carried out by introducing the flowable polyvinyl chloride paste 1a to a reservoir 1 through inlet 1b, roller 2, driven by means not shown in the drawing, is mounted opposite the single cylinder 16 at a position corresponding to about 8:00 o'clock and is rotated in a clockwise direction with the lower portion dipping into the paste 1a which picks up a layer of the paste on its surface, which is transferred to roller 3 rotating in a counter clockwise direction which in turn transfers the paste to the engraved surface of belt (mold) 15 mounted on the single cylinder 16 which is rotating in a clockwise direction. In order to facilitate depositing the paste 1a in the engraved areas, the applicator roll 3 can be oscillated in a direction parallel with the axis of the single cylinder 16. Alternatively the paste 1a can be poured on the surface of the mold 15 or applied by a brush.

In order to completely fill in the engraved areas and removed the excess paste from the unengraved surface of the rotating belt 15, there are provided scraper blades 4 and a plurality of blades 5. The scraper blades 5 are mounted on an axis which is rotated in a clockwise direction which provides a wiping action.

To further clean the paste 1a from the unengraved surface of the belt 15, which would plug or fill the openings of the finished product, there is provided a roller 6, a portion of which is immersed in a mold aqueous soap soltuion 6a contained in reservoir 6b. The roller 6 is rotated in a clockwise direction in contact with the engraved belt 15 which wipes the unengraved surface clean with the aid of the aqueous soap solution.

To remove any traces of the paste 1a from the unengraved surface of belt 15, and any excess soap solution present thereon, there is provided a further wiping action by a belt 7a rotating in a clockwise direction around guide rolls 7 and 8. The excess material removed from the engraved surface is drained in trough 9 and discharged through outlet 9a.

The engraved belt 15 is rigidly mounted against the periphery of the single cylinder 16 from the applicator roll 3 to the last wiping roll 8. Mounted juxtaposed the single cylinder 16 and engraved belt 15 corresponding to the position between 12:00 o'clock and 5:00 o'clock, there are radiant heaters 10 and reflectors 10a which heat the paste 1a to its fusion temperture, i.e., about 160° C. The polyvinyl chloride paste is exposed to the heat from the radiant heaters for about one to two minutes which is sufficient to fuse the polyvinyl chloride particles in the plasticizer. The source of heat for the radiant heaters may be supplied by liquid fuel, gas, electricity or industrial ovens. The heat can also be applied to the paste in the engraved areas of belt 15 from inside cylinder 16.

After passing through the heat zone between about 12:00 o'clock and 5:00 o'clock positions around single cylinder 16, the bottom of the single cylinder 16 and belt 15 with the fused plastisol in the engraving dips into a cooling bath of water in reservoir 11. In order to maintain the water bath between 40–60° C., cool water is continuously introduced into reservoir 11 through inlet 11a and the heated water is discharged through outlet 11b.

Alternately the fused plastisol in the engraved mold can be cooled by a blast of cool air instead of immersing in the water bath.

After the fused plastisol has been cooled below its deformation temperature, it is removed from the engraved surface of belt 15 in the form of open-work plastic sheet material. It is passed around guide roll 12 and wound up on reel 13a.

After the openwork plastic sheet material 13 has been removed from the engraved surface of belt 15, the belt is cleaned by means of an absorbent belt 14 rotating around guide rolls 14a and 14b, the process is repeated.

Figure 2:
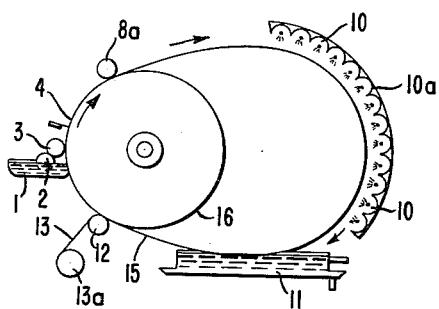
FIGURE 2 is a side view of a modified version of the apparatus shown in FIGURE 1 wherein the engraved belt is separated from the main part of the apparatus for a portion of its run.

FIGURE 2 of the drawing shows an alternate arrangement in which the engraved belt 15 is separated from the single cylinder 16 as it passes through the heat zone. This has the advantage of requiring less heat since there is relatively little, if any, heat consumed in heating the other parts of the apparatus, particularly the single cylinder 16. Also there is less heat to be dissipated at the cooling station 11 in order to reduce the temperature of the openwork plastic sheet below its deformation temperature.

I claim:

An apparatus for producing continuously openwork plastic sheet material resembling lace and the like comprising:

(a) a single cylinder,
(b) a continuous metal belt having interconnected engraving on its outer surface and a circumference greater than that of said single cylinder, (c) means to rotate said single cylinder and said belt around said single cylinder so that said belt is in direct contact with a portion of the outer surface of said single cylinder, (d) means to continuously deposit a flowable polyvinyl chloride plastisol composition in the recesses of said engraving on a portion of said belt in contact with said single cylinder, (e) means to continuously wipe excess plastisol composition from the non-recessed areas of a portion of said belt in contact with said single cylinder, (f) means to heat said plastisol composition in said recesses to its fusion temperature while that portion of said belt, containing said plastisol being heated, is out of contact with said single cylinder, (g) means to cool a portion of said belt out of contact with said single cylinder and containing said fused plastisol, and (h) means to continuously separate said cooled and fused plastisol from said engraved surface.

References Cited in the file of this patent

UNITED STATES PATENTS

| | | |
|---|---|---|
| 2,226,186 | Van Derhoef | Dec. 24, 1940 |
| 2,327,627 | Esselen | Aug. 24, 1943 |
| 2,345,013 | Soday | Mar. 28, 1944 |
| 2,380,363 | Land et al. | July 10, 1945 |
| 2,825,094 | Zeigler | Mar. 4, 1958 |
| 2,849,752 | Leary | Sept. 2, 1958 |
| 2,957,207 | Roop et al. | Oct. 25, 1960 |

FOREIGN PATENTS

| | | |
|---|---|---|
| 206,366 | Australia | Feb. 7, 1957 |